United States Patent
Lee et al.

(10) Patent No.: US 12,219,662 B2
(45) Date of Patent: Feb. 4, 2025

(54) MULTIMEDIA SERVICE PROVIDING DEVICE AND MULTIMEDIA SERVICE PROVIDING METHOD

(71) Applicant: LG ELECTRONICS INC., Seoul (KR)

(72) Inventors: Donghun Lee, Seoul (KR); Suhyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 486 days.

(21) Appl. No.: 17/627,267

(22) PCT Filed: Jul. 26, 2019

(86) PCT No.: PCT/KR2019/009344
§ 371 (c)(1),
(2) Date: Jan. 14, 2022

(87) PCT Pub. No.: WO2021/020598
PCT Pub. Date: Feb. 4, 2021

(65) Prior Publication Data
US 2022/0264288 A1  Aug. 18, 2022

(51) Int. Cl.
*H04W 4/00* (2018.01)
*H04L 61/5014* (2022.01)
(Continued)

(52) U.S. Cl.
CPC ........... *H04W 8/26* (2013.01); *H04L 61/5014* (2022.05); *H04L 61/5084* (2022.05);
(Continued)

(58) Field of Classification Search
CPC .... H04W 8/26; H04W 48/16; H04L 61/5014; H04L 61/5084
(Continued)

(56) References Cited

U.S. PATENT DOCUMENTS 9,055,391 B2  6/2015  Kim et al.
2008/0020801 A1*  1/2008  Fesas ............... H04W 28/0808
                                                          455/561
(Continued)

FOREIGN PATENT DOCUMENTS

WO  2015020502  2/2015

OTHER PUBLICATIONS

PCT International Application No. PCT/KR2019/009344, International Search Report dated Apr. 23, 2020, 18 pages.

*Primary Examiner* — Temica M Beamer
(74) *Attorney, Agent, or Firm* — LEE, HONG, DEGERMAN, KANG & WAIMEY

(57) ABSTRACT

The present invention relates to a device for configuring a group with one or more electronic devices, the device comprising: a communication module for receiving a first message for acquisition of an Internet protocol (IP) address of the one or more electronic devices, and transmitting a second message including a group list and IP addresses allocated to the respective one or more electronic devices, to the one or more electronic devices in response to the first message; a memory connected to the communication module so as to store the group list included in the second message; and a processor which is connected to the communication module and the memory is configured to acquire, via the group list, information on a group serviced by the device, configure, based on the information on the group, a group with the one or more electronic devices, and provide a multimedia service.

12 Claims, 20 Drawing Sheets

(51) Int. Cl.
  *H04L 61/5084* (2022.01)
  *H04W 8/26* (2009.01)
  *H04W 48/16* (2009.01)
  *H04W 84/12* (2009.01)
  *H04W 84/20* (2009.01)
  *H04W 88/08* (2009.01)

(52) U.S. Cl.
  CPC ............ *H04W 48/16* (2013.01); *H04W 84/12* (2013.01); *H04W 84/20* (2013.01); *H04W 88/08* (2013.01)

(58) Field of Classification Search
  USPC .......................................................... 370/329
  See application file for complete search history.

(56) References Cited

U.S. PATENT DOCUMENTS

| | | |
|---|---|---|
| 2013/0057908 A1 | 3/2013 | Park |
| 2013/0223341 A1* | 8/2013 | Kim ..................... H04W 76/14 370/328 |
| 2015/0334084 A1 | 11/2015 | Bigall |
| 2017/0295448 A1 | 10/2017 | McCann et al. |

\* cited by examiner

FIG. 10

Wireless Packet Info
802.11
Logical-Link Control (LLC): Command: Unnumbered frame, Command Frame, SSAP = SNAP, DSAP = SNAP
Ipv4: Src = 192.168.1.1, Dest = 255.255.255.255, Next Protocol = UDP, Packet ID = 42, Total IP Length = 36
Udp: SrcPort = BOOTP server(67), DstPort = BOOTP client(68), Length = 296
Dhcp: Reply, MsgType = OFFER, TransactionID = 0xF33BE7BC
    OpCode: Reply, 2(0x02)
    Hardwaretype: Ethernet
    HardwareAddressLength: 6 (0x6)
    HopCount: 0 (0x0)
    TransactionID: 4080789436 (0xF33BE7BC)
    Seconds: 0 (0x0)
    Flags: 32768 (0x8000)
    ClientIP: 0.0.0.0
    YourIP: 192.168.1.11 ────────────── (A)
    ServerIP: 0.0.0.0
    RelayAgentIP: 0.0.0.0
    ClientHardwareAddress: F8:A2:D6:61:C2:A3
    ServerHostName
    BootFileName
    MagicCookie: 99.130.83.99
    MessageType: OFFER - Type 53
    ServerIdentifier: 192.168.1.1 - Type 54
    IPAddressLeaseTime: IP Address Lease Time: 1800 (0x708) - Type 51
    SubnetMask: 255.255.255.0 - Type 1
    Router: 192.168.1.1 - Type 3
    DomainNameServer: 192.168.1.1 - Type 6
    DHCPEOptionsVendorSpecificInformation
        VendorSpecificInformation - Type 43
          Code: Vendor specific information, 43(0x2B)
          VendorSpecificLength: 12 UINT8(s)
          VendorSpecificExtension: Unknown Vendor - Type 1
            Code: Unknown Vendor, 1(0x01)
            Length: 4 UINT8(s)
            VendorspecificOptionValue: 앞 rr ────── (B)
          VendorSpecificExtension: Unknown Vendor - Type 2
            Code: Unknown Vendor, 2(0x02)
            Length: 4 UINT8(s)
            VendorspecificOptionValue: 뒤
    End
        Code: End of Options, 255(0xFF)

Wireless Packet Info
802.11
Logical-Link Control (LLC): Command: Unnumbered frame, Command Frame, SSAP = SNAP, DSAP = SNAP
Ipv4: Src = 192.168.1.11, Dest = 192.168.1.1, Next Protocol = TCP, Packet ID = 25128, Total IP Length = 56
Tcp: Flags=...AP..., SrcPort=51712, DstPort=8888, PayloadLen=16, Seq=1121552661-1121552677, Ack=6511, Win=256
  SrcPort: 51712
  DstPort: 8888
  SequenceNumber: 1121552661 (0x42D98915)
  AcknowledgementNumber: 6511 (0x196F)
  DataOffset: 80 (0x50)
  Flags: ...AP...
  Window: 256
  Checksum: 0x4D7D, Good
  UrgentPointer: 0 (0x0)
  TCPPayload: SourcePort=51712, DestinationPort=8888
    TCPPayloadData: Binary Large Object (16 Bytes) ──── C

FIG. 14

| ON | Protocol | Src MAC | Dest |
|---|---|---|---|
| 0x0000 | 88 01 2C 00 00 0A 3B 00 · 11 23 F8 A2 D6 61 C2 A3 |
| 0x0010 | 00 0A 3B 00 11 23 10 17 · 00 00 AA AA 03 00 00 00 |
| 0x0020 | 08 00 45 00 00 38 62 28 · 40 00 80 06 15 3B C0 A8 |
| 0x0030 | 01 0B C0 A8 01 01 CA 00 · 22 B8 42 D9 89 15 00 00 |
| 0x0040 | 19 6F 50 18 01 00 4D 7D · 00 00 00 00 00 10 00 00 |
| 0x0050 | 00 01 00 00 07 D0 C0 A8 01 01 |

FIG. 15

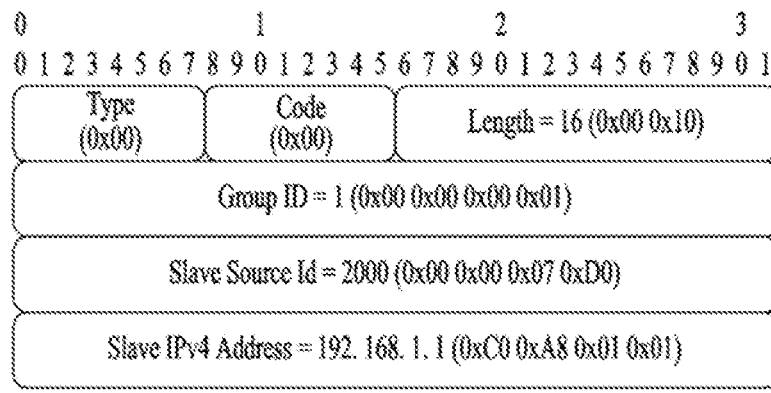

FIG. 16

Wireless Packet Info
802.11
Logical-Link Control (LLC): Command: Unnumbered frame, Command Frame, SSAP = SNAP, DSAP = SNAP
Ipv4: Src = 192.168.1.11, Dest = 192.168.1.1, Next Protocol = TCP, Packet ID = 44, Total IP Length = 60
Tcp: Flags=...AP..., SrcPort=8888, DstPort=52487, PayloadLen=20, Seq=6511 - 6511, Ack=367783239,Win=2
  SrcPort: 8888
  DstPort: 52487
  SequenceNumber: 6511 (0x196F)
  AcknowledgementNumber: 367783239 (0xDB374FE7)
  DataOffset: 80 (0x50)
  Flags: ...AP...
  Window: 2
  Checksum: 0xEC3D, Good
  UrgentPointer: 0 (0x0)
  TCPPayload: SourcePort=8888, DestinationPort=52487
    TCPPayloadData: Binary Large Object (20 Bytes) -------- D

| ON | Protocol | Src MAC | Dest |
|---|---|---|---|
| 0x0000 | 88 02 2C 00 F8 A2 D6 61-C2 A3 00 0A 3B 00 11 23 | | |
| 0x0010 | 00 0A 3B 00 11 23 90 03-00 00 AA AA 03 00 00 00 | | |
| 0x0020 | 08 00 45 00 00 3C 00 2C-00 00 FF 06 38 33 C0 A8 | | |
| 0x0030 | 01 01 C0 A8 01 0B 22 B8-CD 07 00 00 19 6F DB 37 | | |
| 0x0040 | 4F E7 50 18 00 02 EC 3D-00 00 00 01 00 14 00 00 | | |
| 0x0050 | 00 01 00 00 03 E8 00 00 07 D0 00 00 00 00 | | |

```
 0                   1                   2                   3
 0 1 2 3 4 5 6 7 8 9 0 1 2 3 4 5 6 7 8 9 0 1 2 3 4 5 6 7 8 9 0 1
```

| Type (0x00) | Code (0x01) | Length = 20 (0x00 0x14) |

| Group ID = 1 (0x00 0x00 0x00 0x01) |

| Master Source ID = 1000 (0x00 0x00 0x03 0x0E8) |

| Slave Source Id = 2000 (0x00 0x00 0x07 0xD0) |

| Result = 0 (0x00 0x00 0x00 0x00 0x00) (Success) |

FIG. 19

```
Wireless Packet Info
802.11
Logical-Link Control (LLC): Command: Unnumbered frame, Command Frame, SSAP = SNAP, DSAP = SNAP
Ipv4: Src = 192.168.1.1, Dest = 192.168.1.1, Next Protocol = TCP, Packet ID = 44, Total IP Length = 60
Tcp: Flags:...AP..., SrcPort=8888, DstPort=55528, PayloadLen=16, Seq=6511 - 6527, Ack=2364119914, Win=2
    SrcPort: 8888
    DstPort: 55528
    SequenceNumber:6511 (0x196F)
    AcknowledgementNumber: 2364119914 (0x8CE99B6A)
    DataOffset: 80 (0x50)
    Flags: ...AP...
    Window: 2
    Checksum: 0xE32E, Good
    UrgentPointer: 0 (0x0)
    TCPPayload: SourcePort=8888, DestinationPort=55528
        TCPPayloadData: Binary Large Object (16 Bytes)            E
```

FIG. 20

```
ON      Protocol              Src MAC           Dest
0x0000  88 02 2C 00 F8 A2 D6 61-C2 A3 00 0A 3B 00 11 23
0x0010  00 0A 3B 00 11 23 20 03-00 00 AA AA 03 00 00 00
0x0020  08 00 45 00 00 38 00 29-00 00 FF 06 38 3A C0 A8
0x0030  01 01 C0 A8 01 0B 22 B8-D8 E8 00 00 19 6F 8C E9
0x0040  9B 6A 50 18 00 02 E3 2E-00 00 00 02 00 10 00 00
0x0050  00 01 00 00 03 E8 00 00-07 D0
```

MULTIMEDIA SERVICE PROVIDING DEVICE AND MULTIMEDIA SERVICE PROVIDING METHOD

CROSS-REFERENCE TO RELATED APPLICATIONS

This application is the National Stage filing under 35 U.S.C. 371 of International Application No. PCT/KR2019/009344, filed on Jul. 26, 2019, the contents of which are all incorporated by reference herein in its entirety.

TECHNICAL FIELD

The present disclosure relates to a multimedia service providing apparatus. More specifically, the present disclosure relates to a multimedia service providing apparatus and a multimedia service providing method for improving service quality by efficiently using radio resources in providing a multimedia service by forming a group with a plurality of home appliances.

BACKGROUND ART

Recent electronic devices have developed in various forms according to the development of artificial intelligence (AI) and Internet of Things (IoT).

In addition, as the number of types of home appliances used at the same time at home has increased due to the development of various electronic devices, a grouping service for simultaneously controlling a plurality of home appliances according to a user or situation has been provided.

A plurality of electronic devices may be configured as several groups according to the convenience of a user, so that the user may efficiently manage the plural electronic devices by using the grouped electronic devices according to a situation.

Thus, the grouped electronic devices may be linked to each other to form a single ecosystem and provide suitable services to users.

However, in the related art, group information for providing a group management system is transmitted as periodic broadcast information, thereby causing signaling overhead and waste of radio resources.

Further, since the periodic broadcast information usually uses a low data rate, such information causes a delay in user data transmission and thus deteriorates service quality.

DETAILED DESCRIPTION OF THE DISCLOSURE

Technical Problems

An object of the present disclosure is to provide a multimedia service providing apparatus for efficiently using radio resources in order to transmit a group list for configuring a group.

Another object of the present disclosure is to provide a multimedia service providing apparatus for quickly and accurately transmitting a group list for configuring a group.

Another object of the present disclosure is to provide a multimedia service providing apparatus for improving the quality of a service provided to a user in order to transmit a group list for configuring a group.

Objects of the present disclosure are not limited to the aforementioned objects, and other objects of the present invention which are not mentioned above will become apparent to those having ordinary skill in the art upon examination of the following description.

Technical Solutions

According to an aspect of the present disclosure, provided herein is a multimedia service providing apparatus for forming a group with one or more electronic devices, including a communication module configured to receive a first message for obtaining Internet protocol (IP) addresses of the one or more electronic devices and transmit a second message including an IP address allocated to each of the one or more electronic devices and a group list to the one or more electronic devices in response to the first message; a memory connected to the communication module and configured to store the group list included in the second message; and a processor connected to the communication module and the memory and configured to obtain information about a group serviced by the multimedia service providing apparatus through the group list and provide a multimedia service by forming the group with the one or more electronic devices, based on information about the group.

The multimedia service providing apparatus may operate as a master device for controlling the multimedia service in the group, and the one or more electronic devices may operate as slave devices controlled by the master device in the group.

The processor may cause the multimedia service providing apparatus to operate as a soft access point within the group and may control the communication module to transmit data to the one or more electronic devices based on a wireless local area network method.

The processor may control the communication module to skip transmission of a group advertisement message in order to cause the one or more electronic devices to join the group controlled by the multimedia service providing apparatus.

The first message may be a dynamic host configuration protocol (DHCP) discovery message, and the second message may be a DHCP offer message responding to the first message.

The second message may include an IP address of the multimedia service providing apparatus.

Advantageous Effects

According to an embodiment of the present disclosure described above, a multimedia service providing apparatus that efficiently uses radio resources in order to transmit a group list for configuring a group may be provided.

According to an embodiment of the present disclosure, a multimedia service providing apparatus that quickly and accurately transmits a group list for configuring a group may be provided.

According to an embodiment of the present disclosure, a multimedia service providing apparatus that improves the quality of a service provided to a user in order to transmit a group list for configuring a group may be provided.

Effects that can be obtained from the present disclosure are not limited to the aforementioned effects, and other effects may be clearly understood by those skilled in the art from the descriptions given below.

DESCRIPTION OF DRAWINGS

FIGS. 10 and 11 illustrate a log message of a DHCP-OFFER message in DHCPv4.

FIGS. 13 and 14 illustrate a log message of a group registration request message.

FIG. 15 illustrates a packet structure of the group registration request message.

FIGS. 16 and 17 illustrate a log message of a group registration response message.

FIG. 18 illustrates a packet structure of the group registration response message.

FIGS. 19 and 20 illustrate a log message of a group registration cancellation instruction message.

BEST MODE FOR CARRYING OUT THE DISCLOSURE

Reference will now be made in detail to exemplary embodiments of the present disclosure with reference to the accompanying drawings. The construction of an apparatus, which will be described below, is intended to explain an embodiment of the present disclosure and is not intended to be limiting of the scope of the present disclosure. The same reference numbers will be used throughout this specification to refer to the same or like parts.

Although most terms used below have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

A multimedia service providing apparatus according to embodiments of the present disclosure described below may be explained as a master device. Further, one or more electronic devices forming a group with the multimedia service providing apparatus may be explained as slave devices.

The electronic devices described below may have various types, such as not only home appliances used at home, but also office devices used in offices and industrial devices used in factories. In addition, the home appliances may include various devices such as a TV, a refrigerator, a washing machine, an air conditioner, an audio device, a speaker, and a game console.

In particular, the master device according to embodiments of the present disclosure may be implemented as a sound bar, which is an audio device in the form of a bar. In addition, the slave devices according to embodiments of the present disclosure may be implemented as speaker, subwoofers, TVs, etc., linked to the sound bar.

Figure 1:
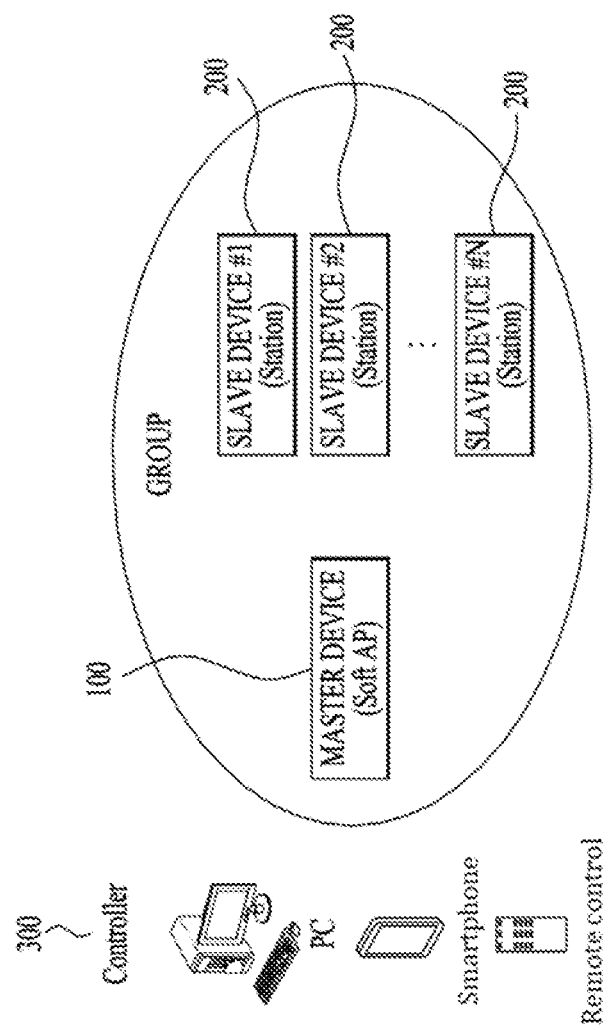
FIG. 1 illustrates a group consisting of a master device and one or more slave devices, and a controller.

FIG. 1 illustrates a group consisting of a master device and one or more slave devices, and a controller.

Referring to FIG. 1, a master device 100 according to an embodiment of the present disclosure may form a group with one or more slave devices 200. A controller 300 may control the grouped master device 100 and one or more slave devices 200. Here, the master device 100 may control a multimedia service in the group, and the slave devices 200 may be controlled by the master device 100 in the group.

In addition, the master device 100 may operate as a soft access point (AP) in the group to transmit data to the one or more slave devices 200 using a wireless local area network (LAN) method.

The soft AP refers to a device capable of providing access to a distributed system via a wireless medium for a station associated with the soft AP.

The soft AP generally operates as a device that provides other user services rather than performing the role of the AP of a wireless LAN. However, for a service using the wireless LAN, the soft AP operates as the AP of a wireless LAN communication method.

The slave devices 200 may operate as stations and transmit and receive data by being connected to the master device 100 in a wireless LAN (WLAN), Bluetooth (BT), Zigbee, Z-Wave, ultra-wide band (UWB), ultra-narrow band (UNB), WirelessUSB, wireless gigabit (WiGig), Bluetooth low energy (BLE), WirelessHD, TransferJet, or Wireless FireWire manner.

The controller 300 may be implemented as a PC, a smartphone, a remote control, etc., and may have a function of configuring and controlling a group for each device.

Figure 2:
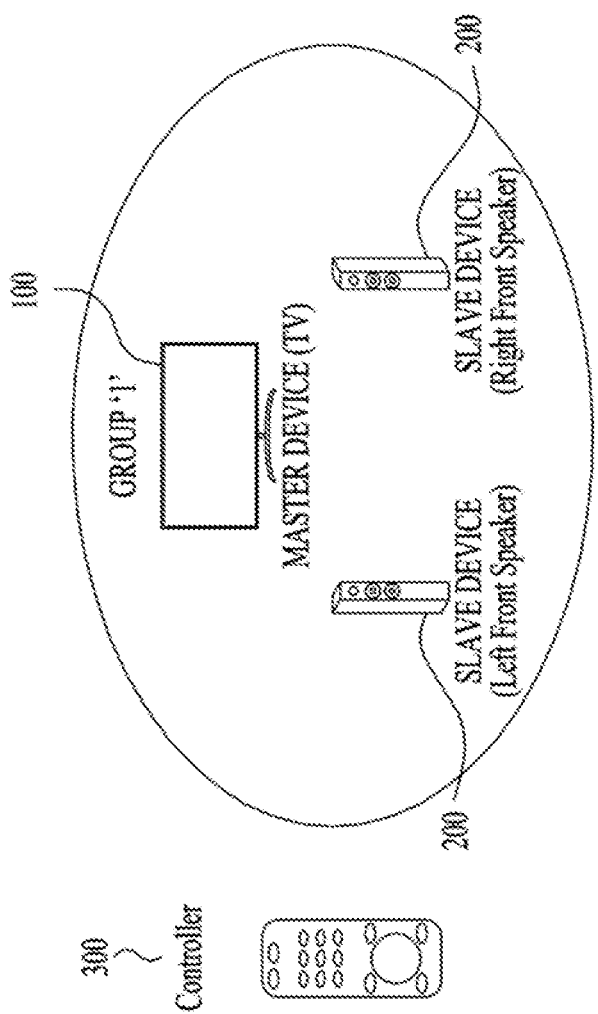
FIG. 2 illustrates a controller and group 1 according to an embodiment of the present disclosure.
Figure 3:
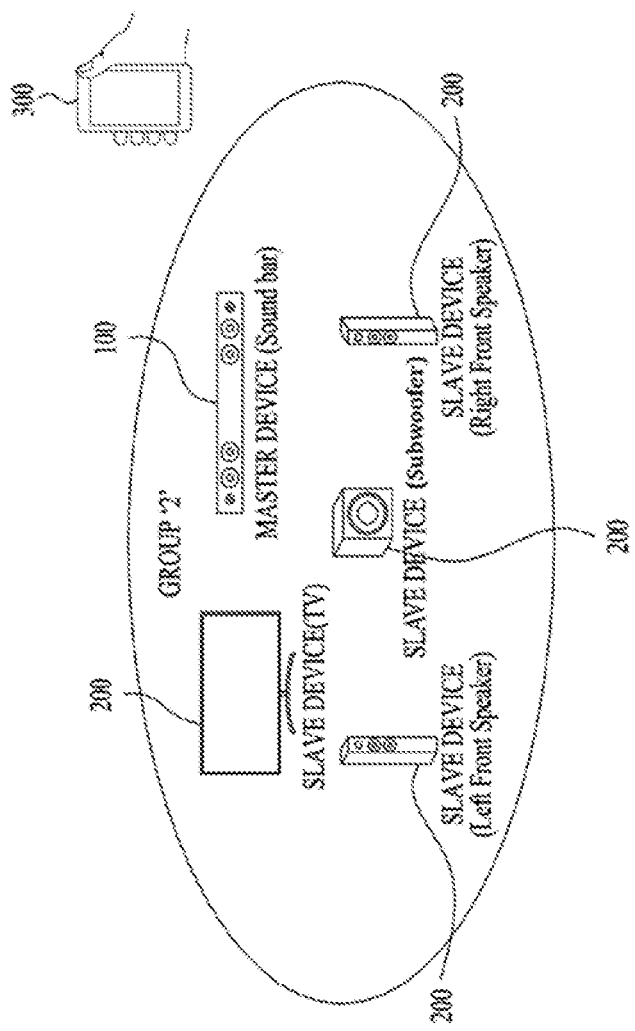
FIG. 3 illustrates a controller and group 2 according to an embodiment of the present disclosure.

FIGS. 2 and 3 illustrate embodiments of a group consisting of a master device and one or more slave devices, and a controller.

FIG. 2 illustrates a controller and group 1 according to an embodiment of the present disclosure.

Referring to FIG. 2, the controller 300 may be implemented as a remote control, the master device 100 may be implemented as a TV, and the slave devices 200 may be implemented as speakers. A plurality of slave devices 200 may be connected to one master device 100 to form a group.

More specifically, a user may configure a TV, a left speaker, and a right speaker as group 1 using the remote control. The user may preset control values of the electronic devices belonging to group 1 by using the remote control. For example, the user may preset a channel of the TV, volumes of the speakers, and the like.

Next, if the user inputs an activation signal of group 1 using the remote control, power of the electronic devices belonging to group 1 may be simultaneously turned on and may be set to the preset control values. Accordingly, the user may control several devices at the same time by the preset values suitable for the preference thereof, without individually controlling the several devices.

Alternatively, group 1 may be activated on a date or at a time, reserved by the user.

FIG. 3 illustrates a controller and group 2 according to an embodiment of the present disclosure.

Referring to FIG. 3, the controller 300 may be implemented as a smartphone, and the master device 100 may be implemented as a sound bar. The slave devices 200 may be implemented as a TV, speakers, and a subwoofer.

More specifically, the user may configure the speakers and the subwoofer in addition to the sound bar operating as the master device 100 as group 2 using a smartphone. In addition, the user may preset control values of the electronic devices belonging to group 2 using the controller 300. When group 2 is activated, the electronic devices belonging to group 2 may be set to the preset values.

Here, the TV and the speakers belonging to group 1 may also belong to group 2 at the same time. The TV and the speakers may be set to values set in group 1 when group 1 is activated, and may be set to values set in group 2 when group 2 is activated.

Alternatively, all the electronic devices belonging to group 2 may be configured as group 3 and may be set to different values according to user convenience or circumstances.

For example, group 2 may be set to suit the preference of user 1, so that group 2 may be activated when user 1 uses the sound bar and the TV. In addition, group 3 may be set to suit the preference of user 2, so that group 3 may be activated when user 2 uses the sound bar and the TV.

The one master device 100 operating as a soft AP and the one or more slave devices 200 operating as stations may be configured as a group after being connected through a WLAN. Here, the master device 100 may control such a group configuration and transmit a group registration message to the slave devices 200. This group registration message may include a group list that the slave devices 200 may join. Here, the group list may include a group list preset by the user using the controller 300.

Hereinafter, a method of configuring a group to provide such a multimedia service will be described in more detail.

Figure 4:
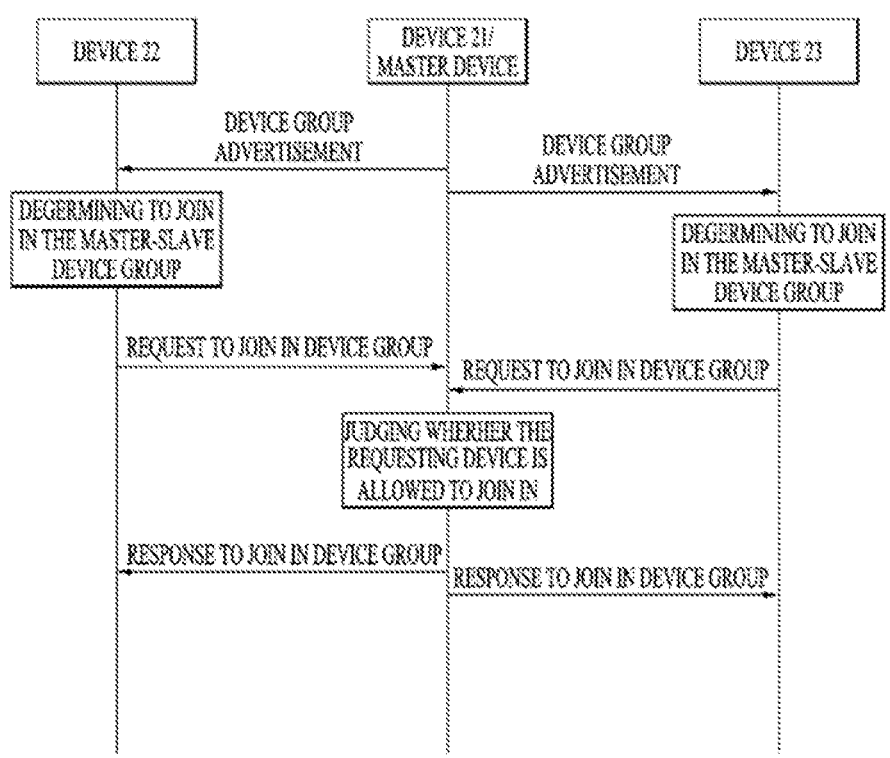
FIG. 4 illustrates an embodiment in which a master device transmits a group advertisement message.

FIG. 4 illustrates an embodiment in which a master device transmits a group advertisement message.

Referring to FIG. 4, in general, the master device transmits the group advertisement message to the one or more slave devices to deliver a group list. The slave devices may determine whether to join a group controlled by the master device based on the received group list.

Here, the master device periodically uses radio resources in order to transmit the group list, which is information about a group controlled thereby. More specifically, the master device transmits the group advertisement message using an Internet protocol (IP) multicast or broadcast method, and the group advertisement message includes the group list. Accordingly, since the master device periodically occupies the radio resources in order to transmit the group list, there is a problem of wasting the radio resources and causing signaling overhead.

The IP multicast or broadcast method does not use acknowledgement (ACK)/negative acknowledgement (NACK) for checking whether a message has been received or not. Therefore, a possibility of succeeding in receiving a message is low and thus a time required to configure the group increases.

In addition, since a Wi-Fi multicast/broadcast method usually uses a low transmission rate, there is a problem in that user data transmission is delayed.

Therefore, new technology is required to solve the problems of the conventional group advertisement message.

Figure 5:
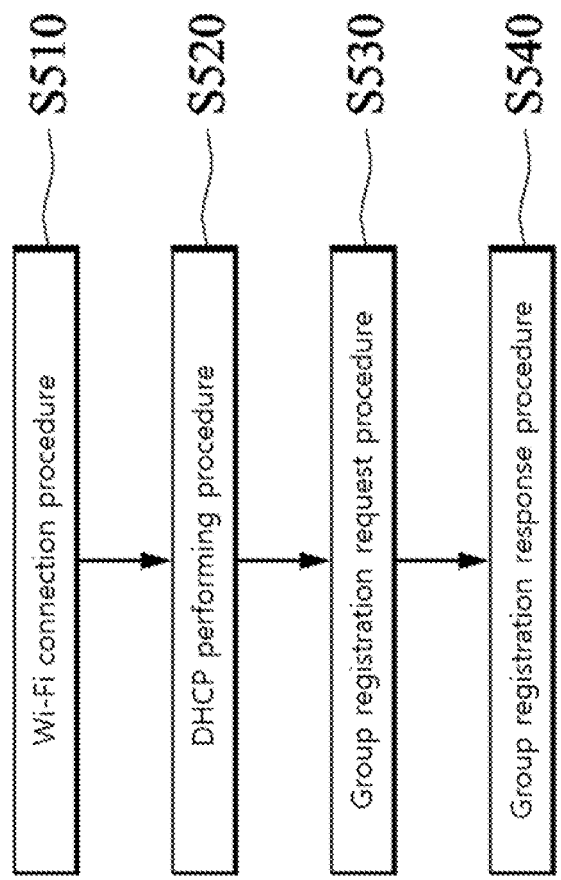
FIG. 5 illustrates a multimedia service providing method according to an embodiment of the present disclosure.

FIG. 5 illustrates a multimedia service providing method according to an embodiment of the present disclosure.

The multimedia service providing method according to an embodiment of the present disclosure includes the following procedures in order to efficiently use radio resources and effectively reduce signaling overhead.

Referring to FIG. 5, the multimedia service providing method according to an embodiment of the present disclosure includes a Wi-Fi connection procedure (S510), a dynamic host configuration protocol (DHCP) performing procedure (S520), a group registration request procedure (S530), and a group registration response procedure (S540).

According to the Wi-Fi connection procedure (S510), a master device according to the embodiments of the present disclosure may be connected to one or more slave devices by a WLAN. More specifically, the master device may operate as a soft AP within a group, and the slave devices operating as stations may perform WLAN access to the master device. The master device and the slave devices may transmit and receive data using a WLAN method by establishing synchronization in this way.

According to the DHCP performing procedure S520, the master device may dynamically allocate IP addresses to the slave device.

Here, DHCP refers to a standard network protocol used to dynamically configure network configuration parameters for performing transmission control protocol (TCP)/IP communication, such as an IP address.

The DHCP performing procedure (S520) may include a DHCP discovery procedure, a DHCP offer procedure, a DHCP request procedure, and a DHCP ACK procedure. Here, in the multimedia service providing method according to an embodiment of the present disclosure, a group list, which is information about a group serviced by the master device, may be transmitted to the slave device in the DHCP offer procedure.

That is, the master device may transmit the group list and an IP address of the master device in addition to the assignment of an IP address of the slave device. A detailed method will be described later.

In the group registration request procedure (S530), the slave device may transmit a group registration request message to the master device in order to join the group managed by the master device.

In the group registration response procedure (S540), the master device receiving the group registration request message may determine whether to cause the slave device to join the group and transmit the result of determination to the slave device.

Figure 6:
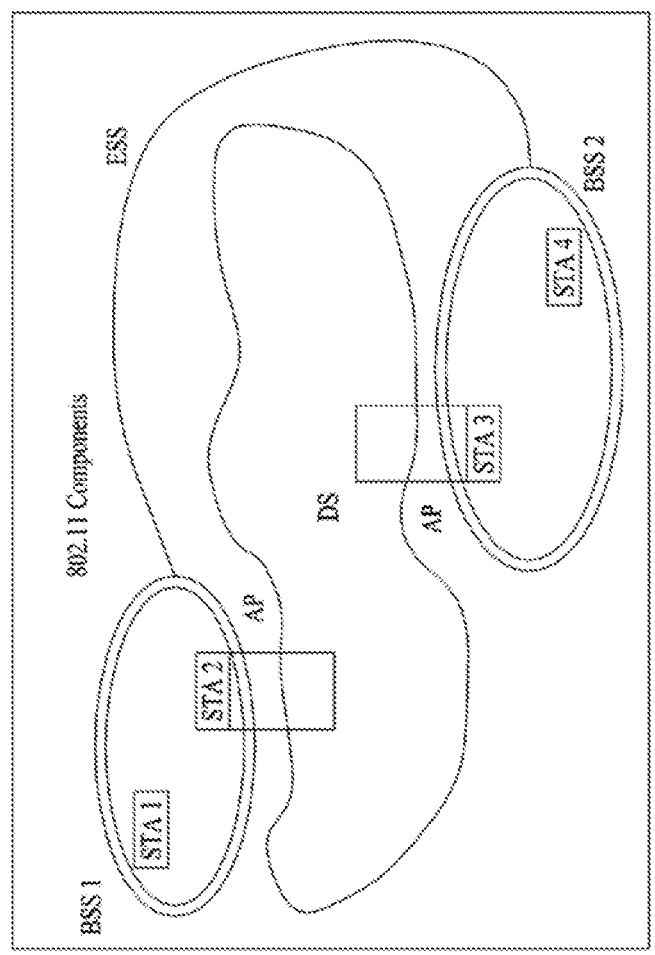
FIG. 6 exemplarily illustrates a configuration of a WLAN system.
Figure 7:
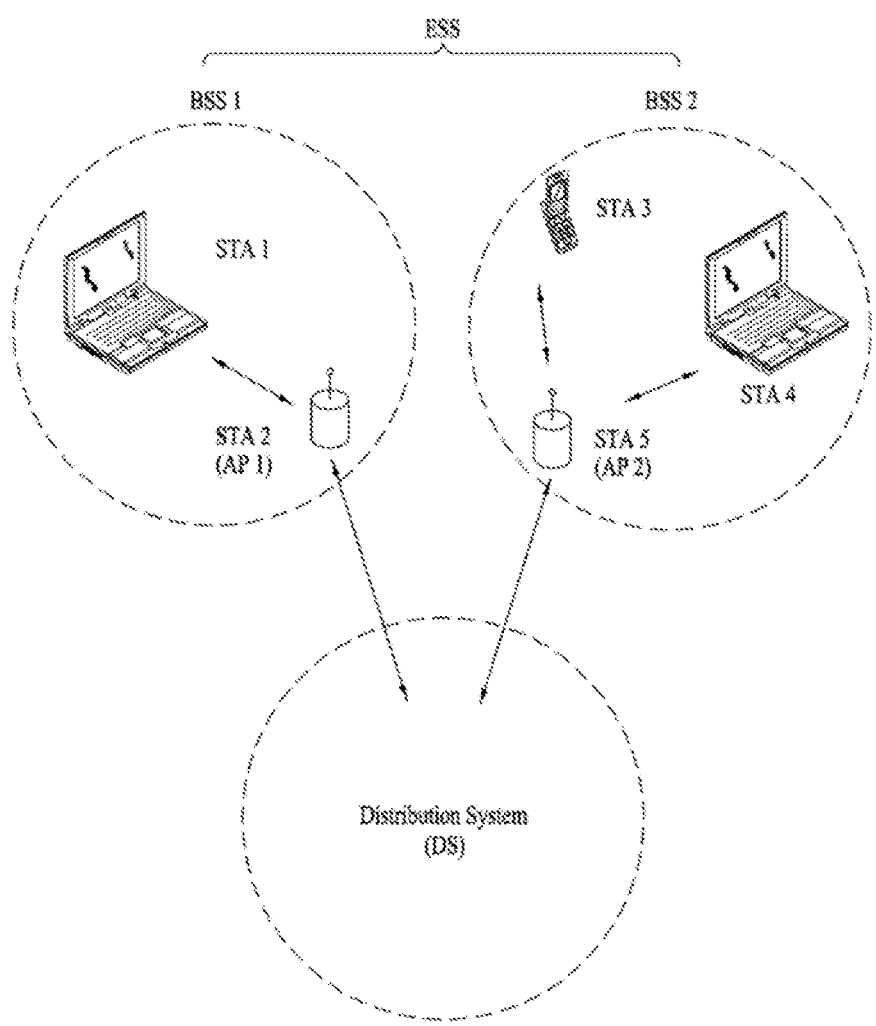
FIG. 7 is a diagram showing an exemplary structure of a WLAN system.

FIGS. 6 and 7 illustrate a detailed Wi-Fi connection procedure according to an embodiment of the present disclosure.

FIG. 6 is a diagram illustrating an embodiment of a configuration of a WLAN system.

A master device and one or more slave devices may be synchronized and connected through the Wi-Fi connection procedure by the WLAN system, before a group is configured and before the slave devices are assigned IP addresses.

Referring to FIG. 6, the master device according to an embodiment of the present disclosure may operate as an AP, and the slave devices may operate as stations (STAs).

As illustrated in FIG. 6, the WLAN system includes one or more basic service sets (BSSs). A BSS is a set of STAs that may communicate with each other through successful synchronization.

An STA is a logical entity including a physical layer interface between a medium access control (MAC) and a wireless medium and includes an AP and a non-AP STA. Among STAs, a portable terminal manipulated by a user is the non-AP STA. When a terminal is simply called an STA, the STA also refers to the non-AP STA.

The AP is an entity that provides access to a distribution system (DS) through a wireless medium to an associated STA coupled to the AP. The AP may be referred to as a centralized controller, a base station (BS), a Node-B, a base transceiver system (BTS), or a site controller.

The BSS illustrated in FIG. 6 is an infrastructure BSS. The infrastructure BSS includes one or more STAs and APs.

As illustrated in FIG. 6, a plurality of infrastructure BSSs may be interconnected via the DS. A plurality of BSSs connected via the DS is called an extended service set (ESS). STAs included in the ESS may communicate with each other, and non-AP STAs with the same ESS may move from one BSS to another BSS while seamlessly performing communication.

The DS is a mechanism for connecting a plurality of APs and does not necessarily have to be a network. If a predetermined distribution service is provided, there is no restriction on the type of the DS. For example, the DS may be a wireless network such as a mesh network or may be a physical structure that connects the APs to each other.

FIG. 7 is a diagram showing an exemplary structure of a WLAN system. In FIG. 4, an example of an infrastructure BSS including a DS is shown.

In the example of FIG. 7, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as mobile phones, handled directly by users. In FIG. 7, STA1, STA3, and STA4 correspond to the non-AP STAs and STA2 and STA5 correspond to AP STAs.

Figure 8:
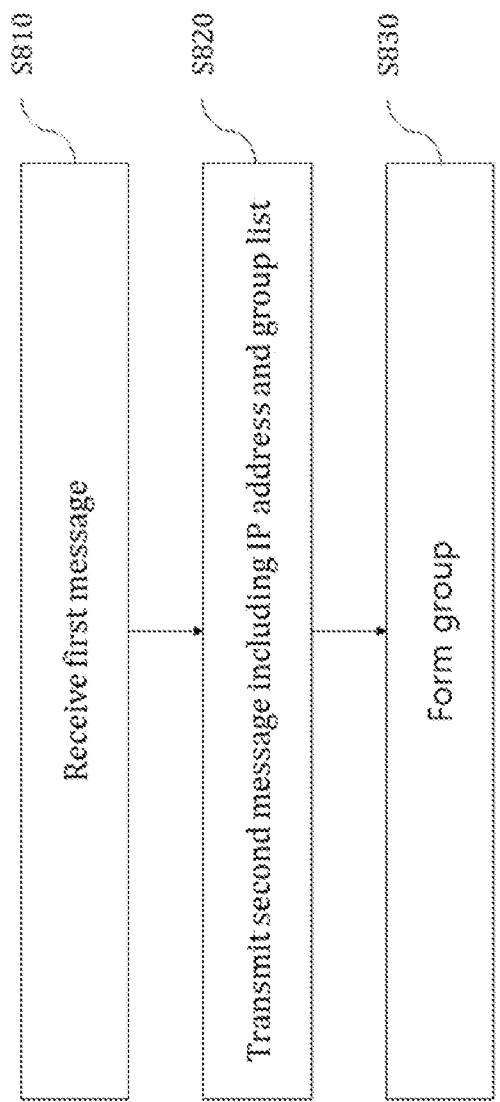
FIG. 8 illustrates an embodiment of a multimedia service providing method.

FIG. 8 illustrates an embodiment of a multimedia service providing method.

The multimedia service providing method of FIG. 8 may be an embodiment of the DHCP performing procedure, the group registration request procedure, and the group registration response procedure, illustrated in FIG. 5, and may be performed after the Wi-Fi connection procedure.

Referring to FIG. 8, the multimedia service providing method may include receiving a first message for obtaining IP addresses of one or more electronic devices (S810) and transmitting a second message including an IP address allocated to each of the one or more electronic devices and a group list serviced by a multimedia service providing apparatus to the one or more electronic devices in response to the first message (S820). The multimedia service providing method may further include forming a group with the one or more electronic devices based on the group list to provide a multimedia service (S830).

Here, the reception of the first message and the transmission of the second message may be performed in the DHCP performing procedure.

Figure 9:
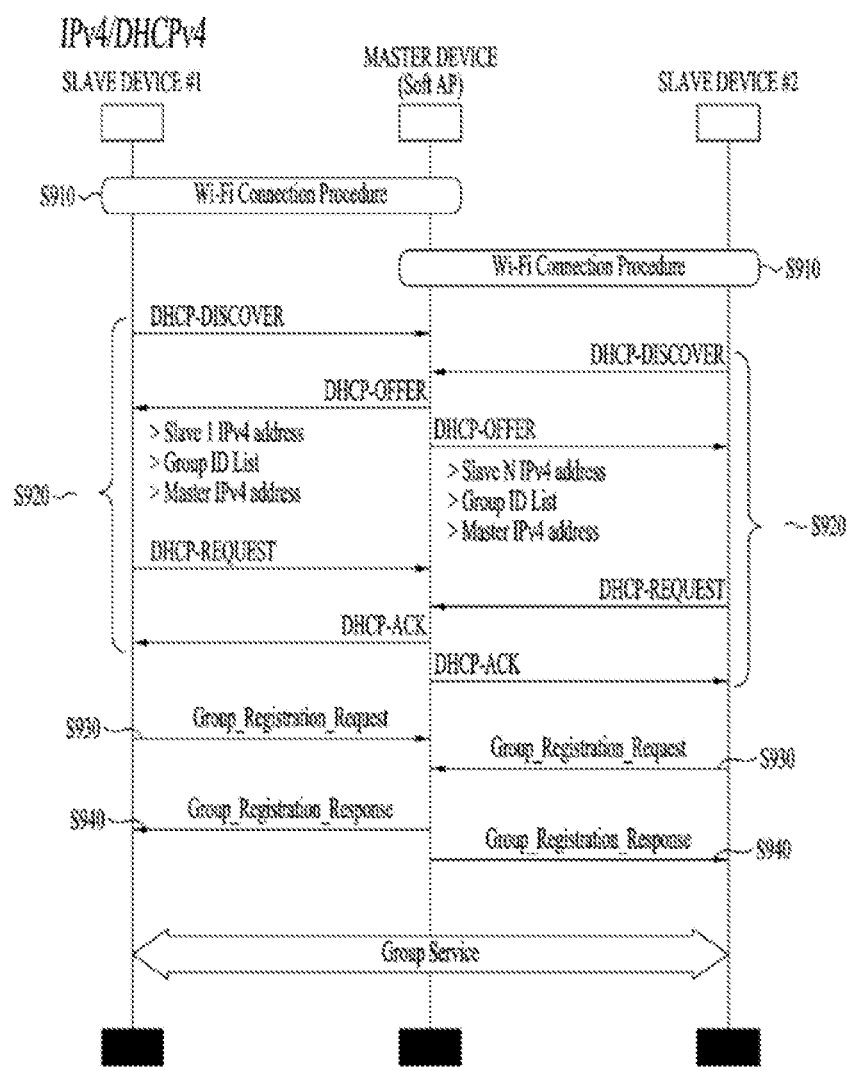
FIG. 9 illustrates an embodiment of a multimedia service providing method implemented in an Internet protocol version 4 (IPv4) network.

FIG. 9 illustrates an embodiment of a multimedia service providing method implemented in an Internet protocol version 4 (IPv4) network.

Here, IPv4 refers to the fourth version of the IP.

Referring to FIG. 9, the multimedia service providing method according to an embodiment of the present disclosure may include a Wi-Fi connection procedure (S910), a DHCP performing procedure (S920), a group registration request procedure (S930), and a group registration response procedure (S940).

In the Wi-Fi connection procedure (S910) according to an embodiment of the present disclosure, a master device and slave devices may be connected through a WLAN to transmit and receive data.

The DHCP performing procedure (S920) according to an embodiment of the present disclosure may include a DHCP discovery procedure, a DHCP offer procedure, a DHCP request procedure, and a DHCP ACK procedure.

More specifically, according to an embodiment of the present disclosure, the master device may receive a DHCP discovery message from a slave device in an IPv4/DHCPv4 environment and transmit a DHCP offer message to the slave device.

The master device may receive the DHCP discovery message for obtaining an IP address of the slave device. In response to the DHCP discovery message, the master device may transmit the DHCP offer message including an IP address assigned to each of one or more slave devices and a group list to the one or more slave devices. The DHCP offer message may include an IP address of the master device.

Here, the group list may be information about a group serviced by the master device.

That is, according to an embodiment of the present disclosure, the master device may transmit information about the group serviced by the master device as well as the IP address of the slave device in the DHCP offer message. In other words, the slave device may receive the IP address allocated thereto and at the same time receive the information about the group controlled by the master device. Accordingly, instead of periodically transmitting the information about the group to all slave devices, the master device may transmit the group list at a time in an IP address allocation procedure. Accordingly, the master device and the slave devices may efficiently use radio resources. Upon successfully receiving the received group list, the slave device may transmit an ACK message for the received group list, so that group list transmission efficiency may be improved.

The DHCP offer message may include a group ID list and a master device IP address. In addition, the information about the group may include the group ID list, group activation information, and group registration information.

The group activation information may be information about a group activated by a user through a controller. The group activation information may include information about deactivation of the group after a predetermined time by setting a timer by the user.

The group registration information may include product information of the master device or information of electronic devices included in the group.

For example, the master device may be implemented as the sound bar as illustrated in FIG. 3 as an embodiment. Here, the group list may include 7.1 channels, 5.1 channels, 2.1 channels, 2 channels, 5.1.2 channels, etc., and each group may be configured as a unique group ID. The DHCP offer message may include the group ID list and information about a slave device connected to each group ID.

The master device transmits the DHCP offer message only once in a process in which each slave device is assigned an IP address. Accordingly, the master device may not transmit a group advertisement message in order to cause one or more slave devices to join a group controlled by the master device. Thus, the problems of wasting radio resources and deteriorating service quality provided to users, which are conventionally generated when the master device periodically transmits the group advertisement message, may be mitigated.

The DHCP offer message may include an IP address of the slave device and an IP address of the master device.

The master device may transmit an activation/deactivation message for each group ID to the slave device. This activation/deactivation message may be included in the DHCP offer message and transmitted or may be transmitted in a group registration procedure. Here, a timing at which the activation/deactivation message is transmitted is not limited to the group registration procedure.

The master device may receive a DHCP request message from the slave device and may transmit a DHCP ACK message.

In the group registration request procedure (S930) according to an embodiment of the present disclosure, the slave device may transmit a group registration request message to the master device. The group registration request message may be a message through which the slave device makes a request for registration in a group controlled by the master device.

More specifically, the group registration request message may include a group ID, a slave source ID, a slave address, and group specific information. The group ID may mean an ID of a group activated by the activation/deactivation message among groups included in the group list received by the slave device. For example, if it is confirmed that 2.1 channels among the groups included in the group list are activated by the activation/deactivation message, the slave device may transmit a group ID corresponding to the 2.1 channels to the master device.

In the group registration response procedure (S940) according to an embodiment of the present disclosure, the master device may transmit a group registration response message to the slave device. Here, the group registration response message may be a message for transmitting the result of the group registration request of the slave device.

More specifically, the group registration response message may include a group ID, a master source ID, a slave source ID, a group registration request result message, and group specific information. The group registration request result message may include an acceptance or rejection message. When the group registration request message includes the rejection message, the rejection message may include information about a reason for rejection. The group specific information may be used if there is additional information required according to a service provided by the group.

The multimedia service providing method according to an embodiment of the present disclosure may further include a group registration cancellation procedure. According to the group registration cancellation procedure, the master device may transmit a group registration cancellation instruction message to the slave device and receive a group registration cancellation request message from the slave device. Here, the group registration cancellation instruction message may include a group ID, a master source ID, and a slave source ID. The group registration cancellation request message may include a group ID, a master source ID, and a slave source ID.

Figure 11:
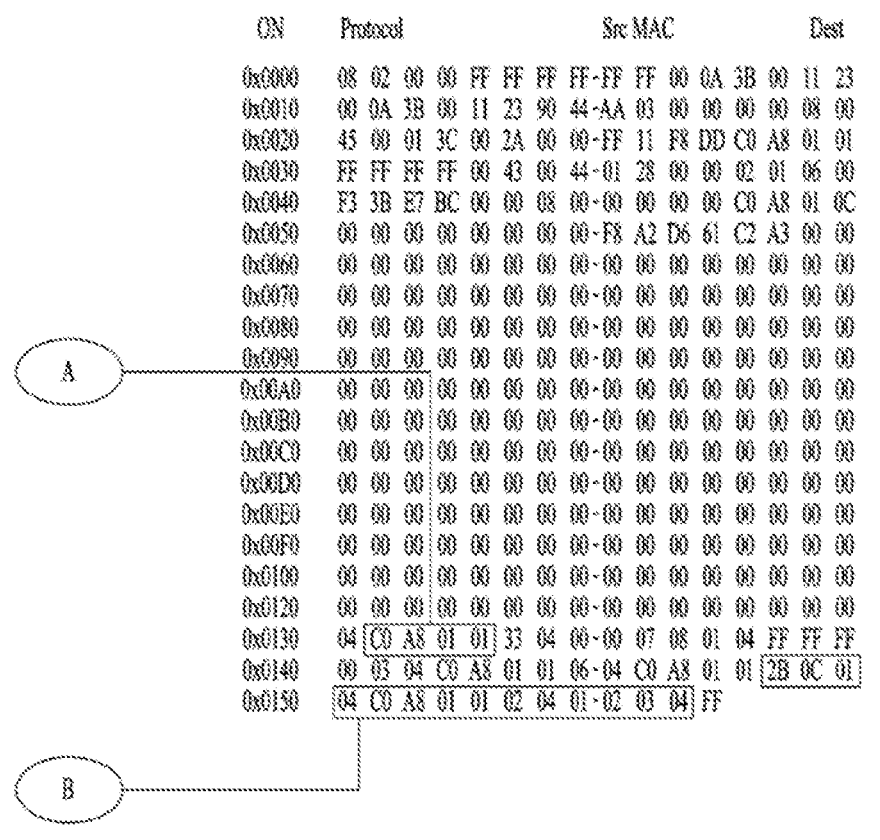

FIGS. 10 and 11 illustrate a log message of a DHCP-OFFER message in DHCPv4.

The DHCP-OFFER message according to an embodiment of the present disclosure is a message transmitted by the master device to the slave device in the DHCP offer procedure and may include a slave IPv4 address, a master IPv4 address, and a group ID list.

Referring to FIGS. 10 and 11, a portion indicating the slave IPv4 address may be 'YourIP: 192.168.1.11' in FIG. 10 and 'C0 A8 01 01' in FIG. 11. The slave IPv4 address assigned may be 192.168.1.11.

The DHCP-OFFER message may include DHCP vendor specific information. The DHCP vendor specific information may include a master IPv4 address and a group ID list. The vendor specific information may be a portion indicated by a rectangle below 'DHCPEOptiosVendor Specific Information' in FIG. 10. The vendor specific information may be '2B 0C 01 04 C0 A8 01 01 02 04 01 02 03 04', which is a portion indicated by an arrow in FIG. 11. Here, 'C0 A8 01 01' may indicate the master IPv4 address, and '01 02 03 04' may indicate the group ID list.

FIG. 10 and the following log message and packet structure illustrate only an embodiment of the present disclosure, and the present disclosure is not limited thereto and may be expressed in various ways.

Figure 12:
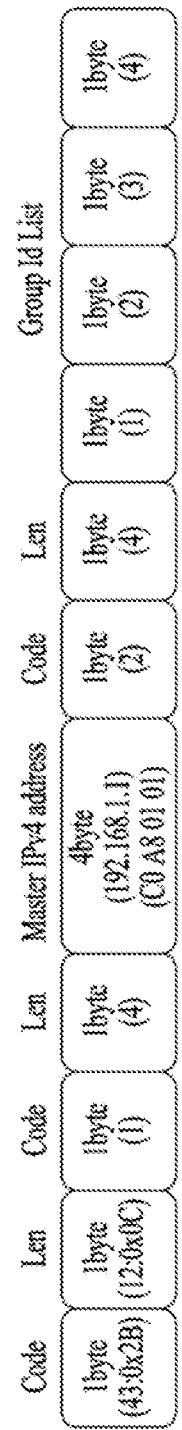
FIG. 12 illustrates a packet structure of DHCP vendor specific information.

FIG. 12 illustrates a packet structure of DHCP vendor specific information.

Referring to FIG. 12, the vendor specific information may be represented as '2B 0C 01 04 C0 A8 01 01 02 04 01 02 03 04'. Thereamong, C0 A8 01 01 may indicate a master IPv4 address, which may indicate that the master IPv4 address is 192.168.1.1.

In addition, 01 02 03 04 may indicate a group ID list, which means that the group ID list is 1, 2, 3, 4.

FIGS. 13 and 14 illustrate a log message of a group registration request message.

FIG. 15 illustrates a packet structure of the group registration request message.

The group registration request message is a message transmitted by the slave device to the master device for a group registration request.

The group registration request message may include a group ID, a slave source ID, and a slave IPv4 address.

Referring to FIGS. 13 and 14, the group registration request message may be represented as '00 00 00 10 00 00 00 01 00 00 07 D0 C0 A8 01 01'. Referring to the packet structure of FIG. 15, it may be appreciated that the group ID to which the slave device belongs is '1', the slave source ID is '2000', and the slave IPv4 address is 192.168.1.11.

Figures 17, 18:
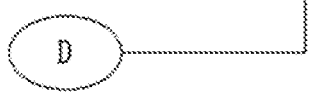

FIGS. 16 and 17 illustrate a log message of a group registration response message.

FIG. 18 illustrates a packet structure of the group registration response message.

The group registration response message is a message transmitted by the master device to the slave device in response to the group registration request message.

The group registration response message may include a group ID, a master source ID, a slave source ID, and a result value.

Referring to FIGS. 16 and 17, the group registration response message may be represented as '00 01 00 14 00 00 00 01 00 00 03 E8 00 00 07 D0 00 00 00 00'. Therethrough, it may be appreciated that the group ID to which the slave device belongs is '1', the master source ID is '1000', the slave source ID is '2000', and the result value is '0'. Here, the result value of 0 may mean that the result of the group registration request message transmitted by the slave device is successful. The result value of '1' may mean that the result of the group registration request message is failure.

FIGS. 19 and 20 illustrate a log message of a group registration cancellation instruction message.

Figure 21:
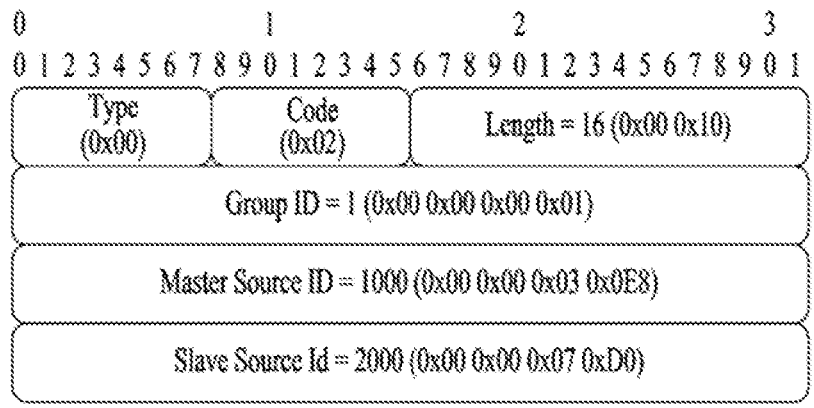
FIG. 21 illustrates a packet structure of the group registration cancellation instruction message.

FIG. 21 illustrates a packet structure of the group registration cancellation instruction message.

The group registration cancellation instruction message is a message transmitted by the master device to the slave device to cancel group registration.

The group registration cancellation message may include a group ID, a master source ID, and a slave source ID.

Referring to FIGS. 19 and 20, the group registration cancellation instruction message may be represented as '00 02 00 10 00 00 00 01 00 00 03 E8 00 00 07 D0'. Therethrough, it may be appreciated that the group ID to which the slave device belongs is '1', the master source ID is '1000', and the slave source ID is '2000'.

Figure 22:
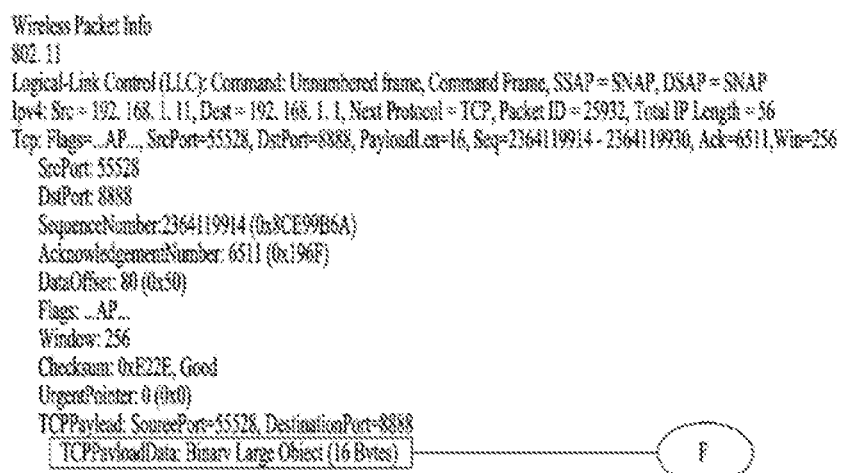
FIGS. 22 and 23 illustrate a log message of a group registration cancellation request message.
Figures 23, 24:
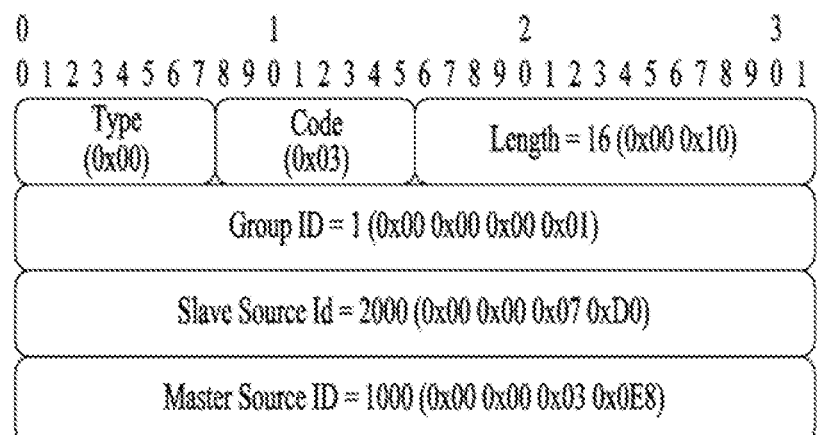
FIG. 24 illustrates a packet structure of the group registration cancellation request message.

FIGS. 22 and 23 illustrate a log message of a group registration cancellation request message.

FIG. 24 illustrates a packet structure of the group registration cancellation request message.

The group registration cancellation request message is a message transmitted by the slave device to the master device for a group registration cancellation request.

The group registration cancellation request message may include a group ID, a slave source ID, and a master source ID.

Referring to FIGS. 22 and 23, the group registration cancellation instruction message may be represented as '00 03 00 10 00 00 00 01 00 00 07 D0 00 00 03 E8'. Therethrough, it may be appreciated that the group ID to which the slave device belongs is '1', the slave source ID is '2000', and the master source ID is '1000'.

Figure 25:
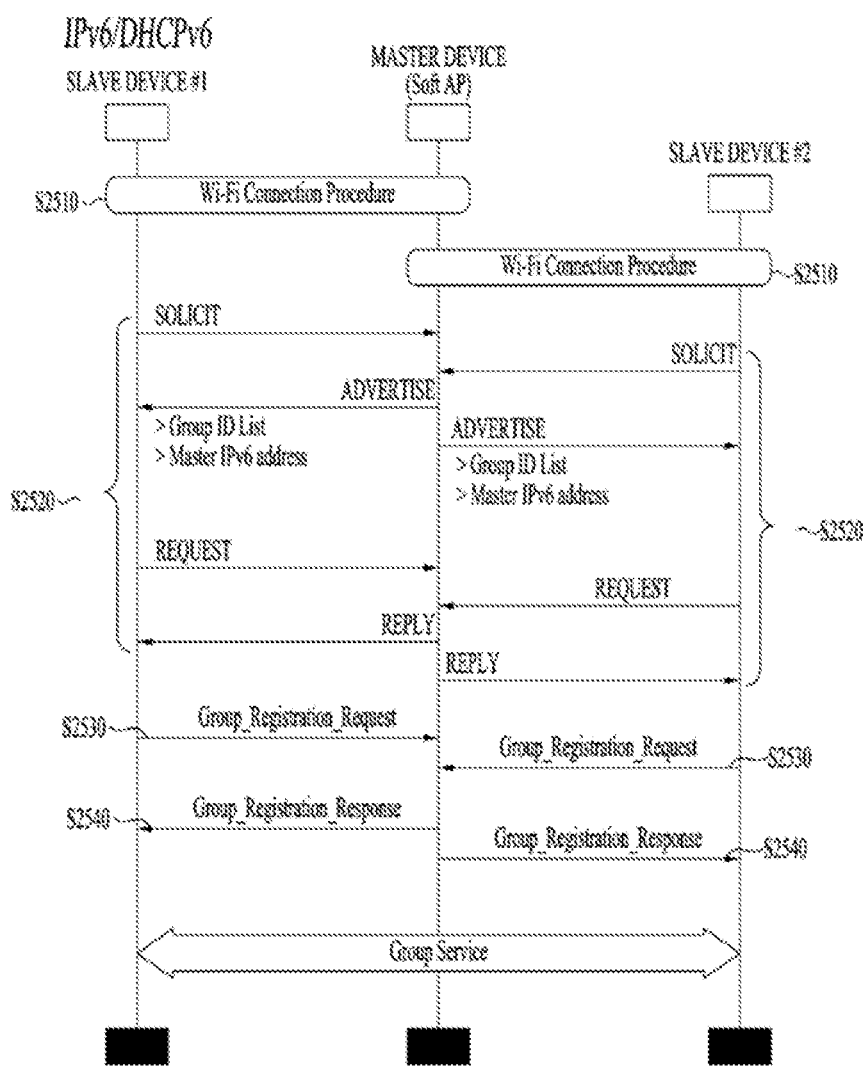
FIG. 25 illustrates an embodiment of a multimedia service providing method implemented in an IPv6 network.

FIG. 25 illustrates an embodiment of a multimedia service providing method implemented in an IPv6 network.

Referring to FIG. 25, the multimedia service providing method according to an embodiment of the present disclosure may include a Wi-Fi connection procedure (S2510), a DHCPv6 performing procedure (S2520), a group registration request procedure (S2530), and a group registration response procedure (S2540).

The Wi-Fi connection procedure (S2510), the group registration request procedure (S2530), and the group registration response procedure (S2540) may be performed similarly to the IPv4 procedure described with reference to FIG. 9.

The DHCPv6 performing procedure (S2520) according to an embodiment of the present disclosure may include a solicit procedure, an advertise procedure, a request procedure, and a reply procedure.

More specifically, the master device in an IPv6/DHCPv6 environment receives a Solicit message from the slave device, transmits an Advertise message, receives a Request message, and transmits a Reply message. Here, the Advertise message may include a group list and an IP address of the master device.

Figure 26:
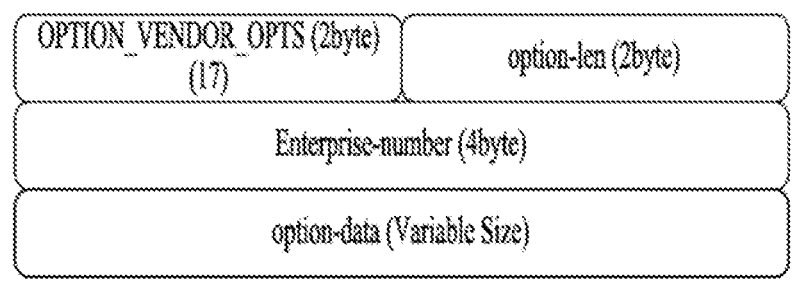
FIG. 26 illustrates a packet structure in DHCPv6.

FIG. 26 illustrates a packet structure in DHCPv6.

Referring to FIG. 26, the master device may transmit DHCPv6 vendor specific information (RFC3315) to the slave device. The vendor specific information may include option data that may be set to a variable size, and the option data may include a group ID list and a master IPv6 address.

Figure 27:
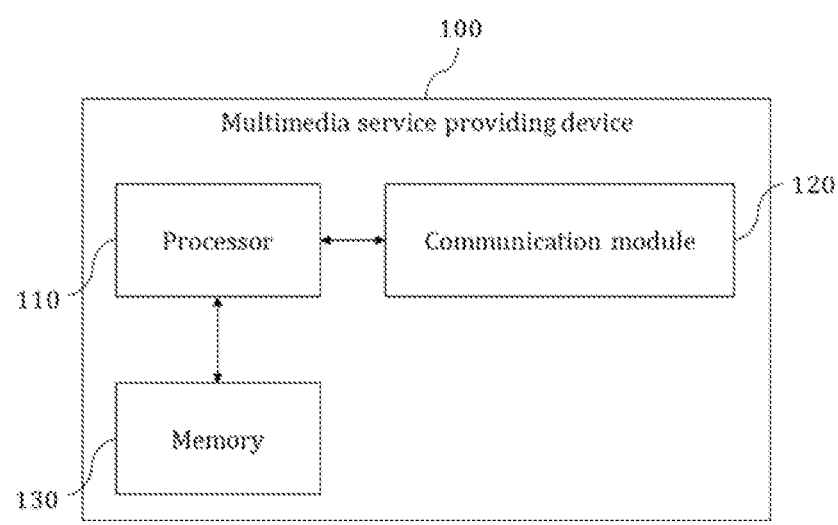
FIG. 27 is a diagram illustrating the configuration of a multimedia service providing apparatus.

FIG. 27 is a diagram illustrating the configuration of a multimedia service providing apparatus.

A multimedia service providing apparatus 100 according to an embodiment of the present disclosure may include a processor 110, a communication module 120, and a memory 130.

The communication module 120 may receive a first message for obtaining IP addresses of one or more electronic devices and transmit a second message including an IP address allocated to each of the one or more electronic devices and a group list to the one or more electronic devices in response to the first message.

The memory 130 may be connected to the communication module 120 to store the group list included in the second message.

The processor 110 may be connected to the communication module 120 and the memory 130. The processor 110 may be configured to obtain information about a group serviced by the multimedia service providing apparatus through the group list and to provide a multimedia service by forming a group with one or more electronic devices, based on information about the group.

Here, the multimedia service providing apparatus may operate as the master device 100 for controlling the multimedia service within the group. The one or more electronic devices may operate as slave devices 200 controlled by the master device 100 in the group.

The multimedia service providing apparatus may operate as a soft AP within the group, and the processor may control the communication module 120 to transmit data to the one or more electronic devices using a WLAN method.

In addition, the processor 110 may control the communication module 120 not to transmit a group advertisement message in order to cause the one or more electronic devices to join the group controlled by the multimedia service providing apparatus.

The first message may be a DHCP discovery message, and the second message may be a DHCP offer message responding to the first message.

The second message may include the IP address of the multimedia service providing apparatus.

It is understood by those skilled in the art that various modifications and variations may be made in the present disclosure without departing from the spirit or scope of the present disclosure. Accordingly, the present disclosure is intended to include the modifications and variations of the present disclosure within the appended claims and equivalents thereto.

In this disclosure, both the apparatus and the method have been described, and descriptions of both of the apparatus and method inventions may be applied to complement each other.

Each procedure or method of the above-described embodiments may be performed by hardware/processor/software. The methods presented by the present disclosure may be implemented as code. This code may be written in a processor-readable storage medium and may be read by the processor provided by the apparatus according to embodiments of the present disclosure.

INDUSTRIAL APPLICABILITY

The above-described multimedia service providing apparatus and multimedia service providing method may be applied to various electronic devices.

The invention claimed is:

1. A multimedia service providing apparatus comprising:
   at least one transceiver;
   at least one processor; and
   at least memory storing instructions that cause the at least one processor to perform operations comprising:
      receiving a first message for obtaining Internet protocol (IP) addresses, from each of the one or more electronic devices connected with the multimedia service providing apparatus via a wireless local area network;

transmitting a second message that includes i) an IP address allocated to each of the one or more electronic devices and ii) a list of groups managed by the multimedia service providing apparatus, to the one or more electronic devices in response to the first message;

receiving a group registration request message including a request for a registration in a group managed by the multimedia service providing apparatus, from a first electronic device among the one or more electronic devices; and transmitting a group registration response message including a result of the request of the first electronic device; and controlling, via the multimedia service providing apparatus, electronic devices belonging to the group simultaneously.

2. The multimedia service providing apparatus of claim 1,
wherein the multimedia service providing apparatus operates as a master device for controlling the multimedia service in the group, and
wherein the electronic devices belonging to the group other than the master device operate as slave devices controlled by the master device in the group.

3. The multimedia service providing apparatus of claim 1, wherein the processor causes the multimedia service providing apparatus to operate as a soft access point within the group and controls the communication module to transmit data to the electronic devices belonging to the group based on the wireless local area network.

4. The multimedia service providing apparatus of claim 1, wherein the processor controls the transceiver to skip transmission of a group advertisement message in order to cause the electronic devices to join the group controlled by the multimedia service providing apparatus.

5. The multimedia service providing apparatus of claim 1, wherein the first message is a dynamic host configuration protocol (DHCP) discovery message, and the second message is a DHCP offer message responding to the DHCP discovery message.

6. The multimedia service providing apparatus of claim 1, wherein the second message further includes an IP address of the multimedia service providing apparatus.

7. A multimedia service providing method of providing a multimedia service by a multimedia service providing apparatus, the multimedia service providing method comprising:

receiving a first message from each of one or more electronic devices connected with the multimedia service providing apparatus via a wireless local area network, the first message for obtaining Internet protocol (IP) addresses of the one or more electronic devices;

transmitting a second message that includes i) an IP address allocated to each of the one or more electronic devices and ii) list of groups managed by the multimedia service providing apparatus to the one or more electronic devices in response to the first message;

receiving a group registration request message including a request for a registration in a group managed by the multimedia service providing apparatus, from a first electronic device among the one or more electronic devices; and transmitting a group registration response message including a result of the request of the first electronic device; and controlling, via the multimedia service providing apparatus, electronic devices belonging to the group simultaneously.

8. The multimedia service providing method of claim 7,
wherein the multimedia service providing apparatus operates as a master device for controlling the multimedia service in the group, and
wherein the electronic devices belonging to the group other than the master device operate as slave devices controlled by the master device in the group.

9. The multimedia service providing method of claim 7, wherein the multimedia service providing apparatus operates as a soft access point within the group to transmit data to the electronic devices based on the wireless local area network.

10. The multimedia service providing method of claim 7, wherein the multimedia service providing apparatus skips transmission of a group advertisement message in order to cause the electronic devices to join the group controlled by the multimedia service providing apparatus.

11. The multimedia service providing method of claim 7, wherein the first message is a dynamic host configuration protocol (DHCP) discovery message, and the second message is a DHCP offer message responding to the DHCP discovery message.

12. The multimedia service providing method of claim 7, wherein the second message further includes an IP address of the multimedia service providing apparatus.

\* \* \* \* \*